No. 653,909. Patented July 17, 1900.
T. P. GREGER.
MANHOLE COVER.
(Application filed Apr. 17, 1899. Renewed Dec. 14, 1899.)
(No Model.) 2 Sheets—Sheet 1.
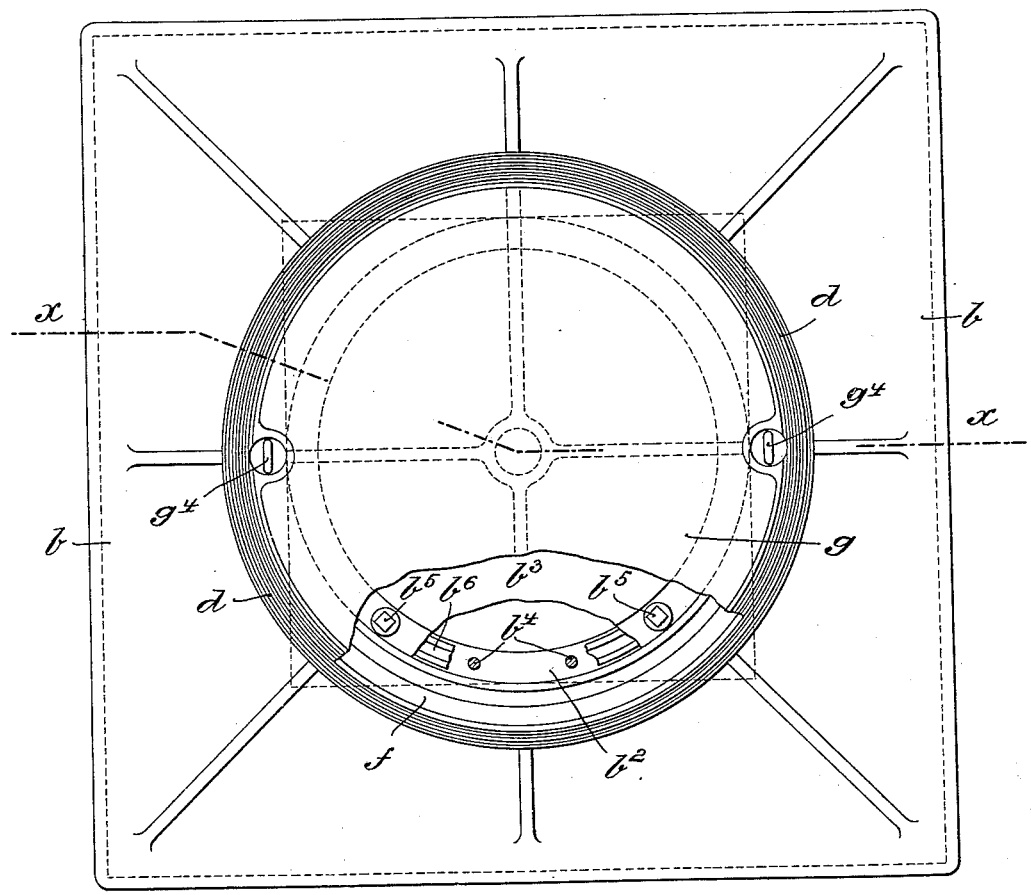
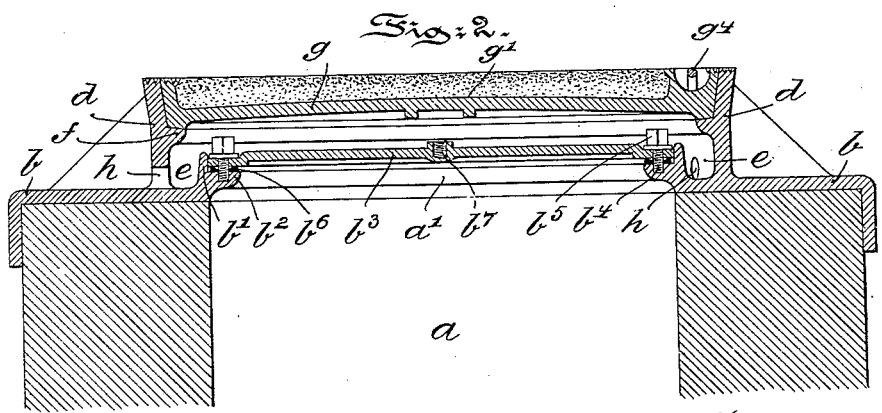
THE NORRIS PETERS CO., PHOTO-LITHO., WASHINGTON, D. C.

No. 653,909. Patented July 17, 1900.
T. P. GREGER.
MANHOLE COVER.
(Application filed Apr. 17, 1899. Renewed Dec. 14, 1899.)

(No Model.) 2 Sheets—Sheet 2.

UNITED STATES PATENT OFFICE.

THOMAS P. GREGER, OF PHILADELPHIA, PENNSYLVANIA, ASSIGNOR TO THE GREGER MANUFACTURING COMPANY, OF CAMDEN, NEW JERSEY.

MANHOLE-COVER.

SPECIFICATION forming part of Letters Patent No. 653,909, dated July 17, 1900.

Application filed April 17, 1899. Renewed December 14, 1899. Serial No. 740,310. (No model.)

*To all whom it may concern:*

Be it known that I, THOMAS P. GREGER, a citizen of the United States, residing at the city of Philadelphia, in the county of Philadelphia and State of Pennsylvania, have invented certain new and useful Improvements in Manhole-Covers, of which the following is a specification.

My invention has relation to covers for manholes—such as are provided for sewers, electric conduits, vaults, and gas-mains—located in pavements or in streets or roadways; and it relates particularly to the construction and arrangement of such covers for said purposes.

The principal objects of my invention are, first, to provide a cover and seat for manholes of simple construction which shall form an efficient seal for the manhole and shall, when the cover is in position, prevent the leakage of water to or the escape of gases from the sewer, conduit, vault, or main covered thereby; second, to provide a seat and double cover for manholes, said seat consisting of a plate provided with a rim and a surrounding wall, upon which rim and wall, respectively, the internal and external covers are supported or seated, and a rubber or similar gasket interposed between the inner cover and its seat; third, to provide a double manhole-cover wherein the interior cover is adapted to be bolted down upon its seat and provided with a rubber or similar gasket interposed between the seat and cover and adapted to be clamped between the same, and the exterior cover provided with a peripheral ring or gasket of rubber or like material clamped between the exterior cover and its seat, whereby a water and air tight double cover for the manhole is secured, and, fourth, to provide in such a cover an internal cover provided with a threaded socket, a bolt adapted to be removably secured therein, and a transverse bar adapted to be secured to the bolt to thereby form a means for removing the interior cover.

My invention, stated in general terms, consists of a cover and seat for manholes constructed and arranged in substantially the manner hereinafter described and claimed.

The nature and scope of my invention will be more fully understood from the following description, taken in connection with the accompanying drawings, forming part hereof, in which—

Figure 3:
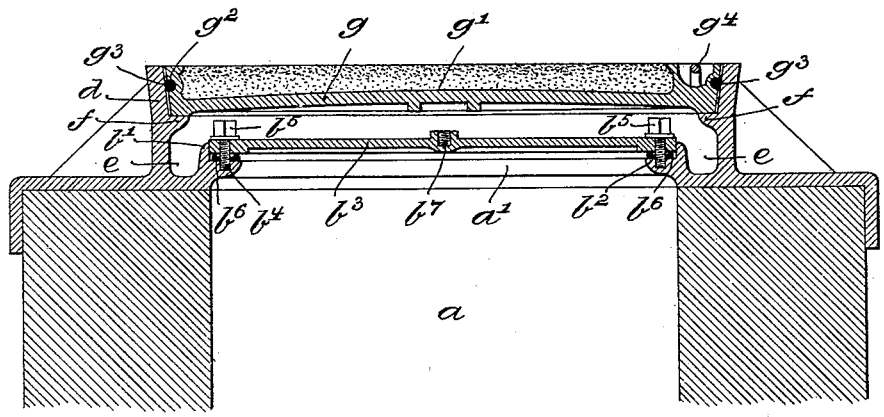
Figure 4:
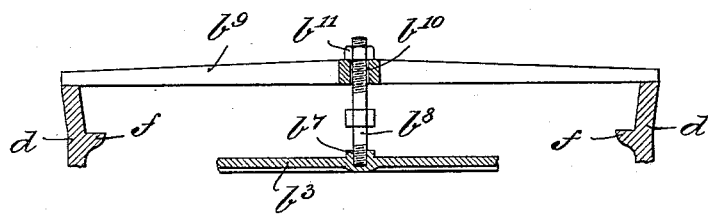
Figure 5:
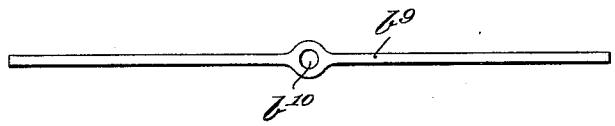

Figure 1 is a top or plan view of a manhole-cover embodying the main features of my invention, portions thereof being removed to more clearly illustrate the construction and arrangement of the same. Fig. 2 is a vertical section on the line $x\ x$ of Fig. 1 and illustrating one form of the cover. Fig. 3 is a similar sectional view illustrating a modified form of the cover. Fig. 4 illustrates, partly in side elevation and partly in section, the means for removing the interior cover from its seat; and Fig. 5 illustrates in top or plan view the bar used in removing the interior cover.

Referring to the drawings, $a$ represents the manhole-entrance to a sewer, conduit, or the like, upon which is mounted the plate $b$, provided with an opening $a'$, surrounded by the annular upwardly-projecting rim $b'$ of approximately the same diameter as the manhole $a$. This rim $b'$ is provided with a recessed annular ledge $b^2$, upon which the interior cover $b^3$ is supported in the manner hereinafter described. Surrounding the rim $b'$ and integral with the plate $b$ is the upwardly-projecting wall $d$, provided with the substantially-horizontal ledge $f$, forming a seat for the external cover $g$. Between the rim $b'$ and wall $d$ is provided a space $e$, adapted when the cover $g$ is not water-tight, as illustrated in Fig. 2, to receive and collect the moisture entering through the cover $g$ and to prevent the same from entering the manhole. This space is drained, when the form of Fig. 2 is used, by the drain-holes $h$ in the wall $d$, which form a means of communication between the space $e$ and the exterior of the wall $d$. The outer cover $g$ is preferably dish-shaped in cross-section and slightly convexed, as at $g'$, in its floor or base. It is filled with concrete, asphalt, or the like, and its top when in position is flush with the top of the wall $d$. Its external periphery is adapted to fit snugly the inner periphery of the wall $d$, and in the form shown at Fig. 3 the external periphery of the cover is provided with a groove $g^2$, into which is fitted a rubber or a similar gasket or annular band $g^3$ to form a water and air tight joint with the wall $d$, and thereby prevent the entrance of moisture and air to the manhole. The cover $g$ is also provided with hand lifting-rings $g^4$, whereby it may be raised out of its seat.

The interior cover $b^3$ by preference is secured to its seat $b^2$ by means of bolts $b^4$, projecting upward from the ledge $b^2$ and passing through holes arranged near the periphery of the cover $b^3$. This cover is clamped down upon its seat by advancing the nuts $b^5$ on the bolts $b^4$ by means of a suitable key. Between the inner cover $b^3$ and seat $b^2$ is located an annular rubber or similar gasket $b^6$, which when the cover is bolted down upon its seat is clamped between the cover and seat to form a water and air tight seal therefor.

To remove the inner cover $b^3$, the same is provided with a substantially-central screw-threaded socket $b^7$, adapted to receive one end of a bolt $b^8$, which when mounted in said socket projects upward from the cover $b^3$ when on its seat above the top of the wall $d$. A long bar $b^9$, provided with a perforation $b^{10}$, registering with the bolt $b^8$, is laid across the annular wall $d$, its ends resting thereon, as illustrated in Fig. 4, and the bolt projecting therethrough. A nut $b^{11}$ when screwed down upon the bolt $b^8$ secures the cover $b^3$ to the bar $b^9$, which bar when lifted will remove the cover $b^3$ from its seat. It is of course to be understood that previous to the placing of the bar in position the nuts $b^5$ will have been removed from the bolts $b^4$ in order to permit of the withdrawal of the cover from its seat.

Having thus described the nature and objects of my invention, what I claim as new, and desire to secure by Letters Patent, is—

1. A manhole of the character described provided with a plate having a concentric upwardly-projecting rim and wall, a ledge formed on said rim, an inner solid cover adapted to be secured to said ledge, a socket formed in the upper surface of said cover, a bolt adapted to be secured in said socket, a bar adapted to rest on said wall and to receive said bolt, means for securing said bar to said bolt, and a concrete-filled outer cover adapted to be seated in said wall, substantially as and for the purposes described.

2. A manhole of the character described provided with a plate having a concentric upwardly-projecting rim and wall, a ledge formed on said rim, an inner solid cover adapted to be secured to said ledge, a socket formed in the upper surface of said cover and a bolt adapted to be secured in said socket, a bar adapted to rest on said wall and to receive said bolt, means for securing said bar to said bolt, and a concrete-filled outer cover gasketed to said wall and said cover provided with hand lifting devices, substantially as shown and described.

3. A manhole of the character described provided with an internal cover having a threaded socket, a bolt adapted to be removably secured therein and a transverse bar adapted to be secured to said bolt to thereby form a means for removing said cover, and a concrete-filled removable cover detachably applied to the wall of said cover and resting on a ledge thereof and said cover provided with lifting devices, substantially as shown and described.

In testimony whereof I have hereunto set my signature in the presence of two subscribing witnesses.

THOMAS P. GREGER.

Witnesses:
J. WALTER DOUGLASS,
THOMAS M. SMITH.